(12) United States Patent
Delfer et al.

(10) Patent No.: US 12,090,521 B2
(45) Date of Patent: *Sep. 17, 2024

(54) MAIL ROUTING SYSTEM UTILIZING PRINTED INDICIA-CONTAINING MAILING ADDRESSES

(71) Applicant: Broadridge Output Solutions, Inc., Newark, NJ (US)

(72) Inventors: Frank W. Delfer, Incline Village, NV (US); Navdeep S. Dhillon, Elk Grove, CA (US)

(73) Assignee: Broadridge Output Solutions, Inc., Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,786

(22) Filed: Mar. 27, 2023

(65) Prior Publication Data

US 2023/0226576 A1 Jul. 20, 2023

Related U.S. Application Data

(63) Continuation of application No. 16/786,715, filed on Feb. 10, 2020, now Pat. No. 11,612,913, which is a
(Continued)

(51) Int. Cl.
*B07C 3/00* (2006.01)
*B07C 3/02* (2006.01)
(Continued)

(52) U.S. Cl.
CPC .............. *B07C 5/3412* (2013.01); *B07C 3/00* (2013.01); *B07C 3/02* (2013.01); *B07C 3/10* (2013.01);
(Continued)

(58) Field of Classification Search
CPC .......... B07C 5/3412; B07C 3/00; B07C 3/02; B07C 3/10; B07C 3/12; B07C 3/14;
(Continued)

(56) References Cited

U.S. PATENT DOCUMENTS 7,991,705 B2 * 8/2011 Pintsov ................ G06Q 10/083
705/336
8,155,976 B1 * 4/2012 Rendich ............. G06Q 10/0832
705/332
(Continued)

*Primary Examiner* — Thomas Randazzo
(74) *Attorney, Agent, or Firm* — GREENBERG TRAURIG, LLP

(57) ABSTRACT

In some embodiments, the present invention provides an exemplary system that includes a mechanism configured to create by a digital mailing services provider, DMSP, a recipient-specific handling information indicia and provide said recipient-specific handling information indicia to a recipient; a mechanism configured to allow the recipient to provide said handling information indicia in delivery address C/O line, on a mail item, thereby indicating to said service provider their desired handling route for the mail item so that a paper mail recipient to receive improved transmission of correspondence from said service provider via both paper and electronic channels solely via including said handling information indicia contained in the delivery address C/O line of the recipient's delivery address on the mail item.

18 Claims, 4 Drawing Sheets

Related U.S. Application Data continuation of application No. 15/962,883, filed on Apr. 25, 2018, now Pat. No. 10,556,254.

(60) Provisional application No. 62/503,254, filed on May 8, 2017.

(51) Int. Cl.
*B07C 3/10* (2006.01)
*B07C 3/12* (2006.01)
*B07C 3/14* (2006.01)
*B07C 5/00* (2006.01)
*B07C 5/34* (2006.01)
*H04L 9/40* (2022.01)
*H04L 51/48* (2022.01)
*H04L 67/12* (2022.01)

(52) U.S. Cl.
CPC ............... *B07C 3/12* (2013.01); *B07C 3/14* (2013.01); *B07C 5/00* (2013.01); *H04L 51/48* (2022.05); *H04L 63/0853* (2013.01); *H04L 67/12* (2013.01); *B07C 2301/0025* (2013.01)

(58) Field of Classification Search
CPC ... B07C 5/00; B07C 2301/0025; H04L 51/48; H04L 63/0853; H04L 67/12; H04L 51/18
See application file for complete search history.

(56) References Cited

U.S. PATENT DOCUMENTS

| | | | |
|---|---|---|---|
| 8,762,529 B1* | 6/2014 | Payne | H04L 9/321 709/225 |
| 10,556,254 B1* | 2/2020 | Delfer | B07C 3/14 |
| 11,612,913 B2* | 3/2023 | Delfer | B07C 5/3412 700/224 |
| 2003/0045945 A1* | 3/2003 | Lopez | B07C 3/20 718/100 |
| 2003/0065629 A1* | 4/2003 | Hill | B07C 3/00 705/401 |
| 2003/0154405 A1* | 8/2003 | Harrison | H04L 63/123 726/9 |
| 2011/0231198 A1* | 9/2011 | Abel | G06Q 10/10 705/1.1 |
| 2013/0346509 A1* | 12/2013 | Elkins | G06Q 10/10 709/206 |
| 2014/0189018 A1* | 7/2014 | Nawaz | G06Q 50/32 700/227 |
| 2014/0374478 A1* | 12/2014 | Dearing | G06Q 10/087 235/385 |
| 2015/0199853 A1* | 7/2015 | Bentley | B07C 3/14 382/101 |
| 2016/0140493 A1* | 5/2016 | Dixon | G06Q 10/0833 705/26.81 |
| 2019/0068398 A1* | 2/2019 | Pancari | H04L 51/42 |

\* cited by examiner

Recipient's Name or Other Identification
[Optional Company Information Line]
Street, Number, & Secondary Information
City, State, and ZIP Code

FIG. 1 PRIOR ART

Recipient's Name or Other Identification
C/O DMSP #12345678
Street, Number, & Secondary Information
City, State, and ZIP Code

FIG. 2

Recipient's Name or Other Identification
C/O DMSP #12345678 *Paperless*
Street, Number, & Secondary Information
City, State, and ZIP Code

FIG. 3

MAIL ROUTING SYSTEM UTILIZING PRINTED INDICIA-CONTAINING MAILING ADDRESSES

CROSS-REFERENCE TO RELATED APPLICATIONS

This application is a continuation of U.S. patent application Ser. No. 16/786,715, filed Feb. 10, 2020, which is a continuation of U.S. patent application Ser. No. 15/962,883, filed Apr. 25, 2018, now U.S. Pat. No. 10,556,254, which claims benefit of U.S. provisional patent application Ser. No. 62/503,254, filed May 8, 2017, which are herein incorporated by reference for all purposes.

BACKGROUND OF THE INVENTION

The subject invention pertains generally to the manner in which delivery address information is printed on mail pieces intended for delivery by the USPS. Specifically, is relates to a mail routing system that utilizes an indicator printed on mail items that indicates how the recipient desires the mail item to be processed. More specifically, it pertains to the delivery address line in which "Care Of" (or "C/O") information indicia reside to indicate to the mail processor whether physical and/or electronic processing is desired for that mail item.

BRIEF DESCRIPTION OF THE SEVERAL VIEWS OF THE DRAWINGS

The invention will be more fully understood by reference to the following drawings which are for illustrative purposes only:

FIG. 1 —PRIOR ART— shows a possible configuration for a printed address on a mail item in which processing/handling indicia is located in an "Optional Company Information Line", as regulated by the USPS.

FIG. 2 shows a possible configuration for a printed address on a mail item in which processing/handling indicia is contained in an exemplary line noting "C/O DMSP #12345678", which directs the mailing entity to process/handle the mail item in a particular physical and/or electronic manner.

FIG. 3 shows a possible configuration for a printed address on a mail item in which processing/handling indicia is contained in an exemplary line noting "C/O DMSP #12345678 Paperless", which directs the mailing entity to process/handle the mail item in an electronic (paperless) manner.

DETAILED DESCRIPTION OF THE INVENTION

Figure 4:
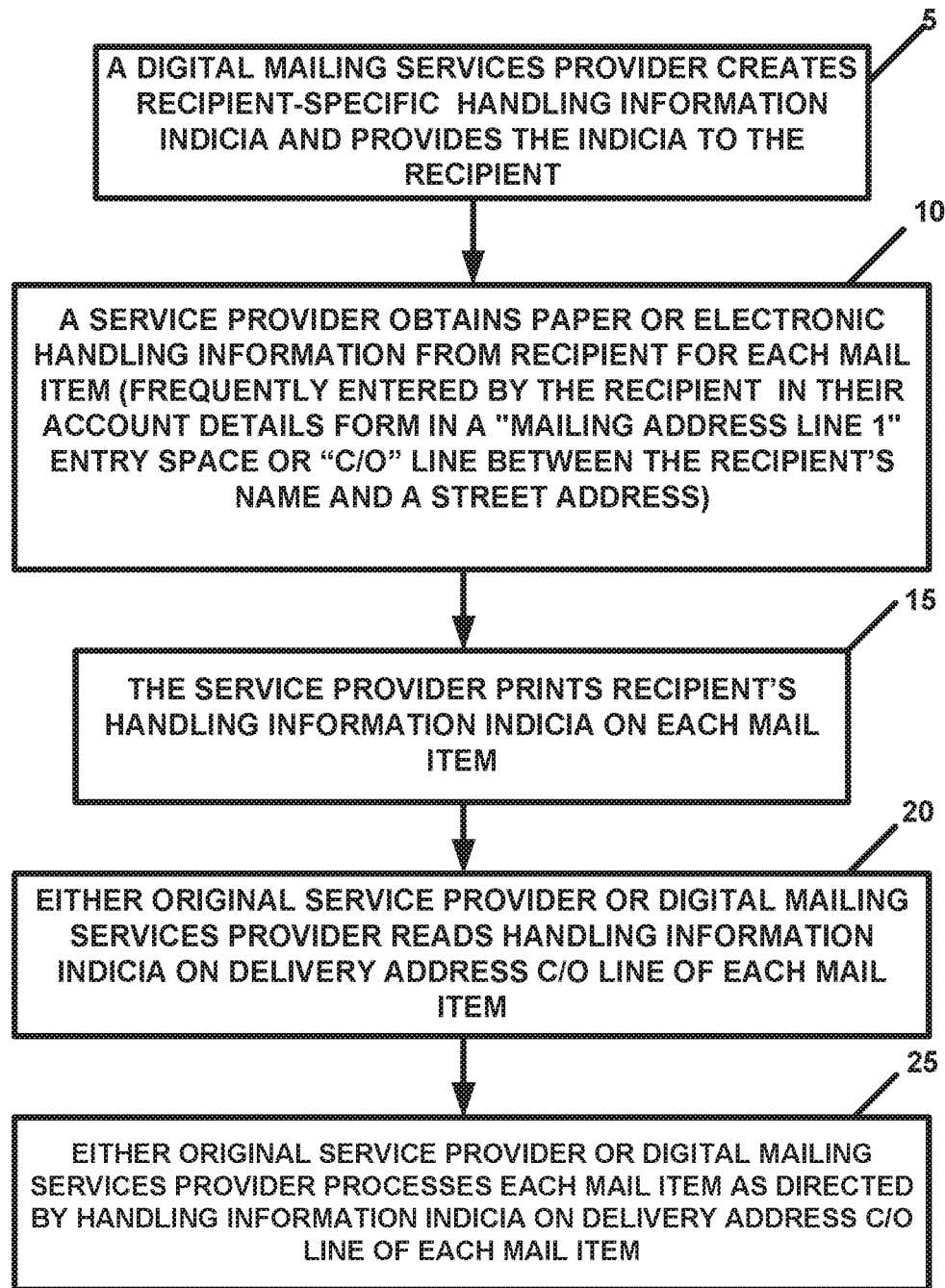
FIG. 4 is a flow diagram showing the subject system's processing steps.

Referring more specifically to the drawings, for illustrative purposes the present invention is embodied in the addressed mail items generally shown in FIG. 1 through FIG. 4. It will be appreciated that the subject system's exact appearance for the printed mail items may vary as to configuration and location of informational lines and that the method may vary as to the specific steps and sequence, without departing from the basic concepts as disclosed herein.

Specifically, an account holder (usually the individual or entity that will have a specific address printed on a mail item) directs a service provider to include, in the delivery address for correspondence, a "Care Of" (C/O) line containing information indicia obtained from and written in conformance with specifications from a third party, a Digital Mailing Services Provider supporting Optional Company Information Line (OCIL) Digital Addressing. The account holder then controls the manner in which such correspondence is conducted, e.g. via paper/physical or electronic means, by manipulating the contents of the "Care Of" line and/or the account settings with either the original service provider or the OCIL Digital Mailing Services Provider or both. Part of the information in the "Care Of" line makes up the recipient's OCIL Digital Mailing Address, providing the Digital Mailing Services Provider the means to direct an electronic version of the correspondence securely to the account holder's digital mail box, in a manner that is superior to both ordinary email and current Digital Postal Mailbox service providers.

Generally, the subject invention interrelates three mail item processing areas: 1) paper mail delivery address standards that are controlled by the United States Postal Service (USPS); 2) the manner in which individual account holders direct government entities and/or commercial interests to address paper/physical correspondence to them; and 3) the manner in which individual account holders direct government entities and/or commercial interests to address electronic correspondence to them.

Paper Mail Delivery Address Standards—With regard to the first item noted above, paper mail delivery address standards, the USPS requires mail piece "delivery addresses" to be written as seen in FIG. 1 (PRIOR ART). Mail pieces bearing delivery addresses in compliance with this standard enjoy the full protection of the U.S. Postal Inspection Service, the primary federal law enforcement and security arm of the USPS. Postal Inspectors protect customers and investigate criminals who fraudulently misuse the U.S. Mail to commit crime. Through its security and enforcement functions, the Postal Inspection Service provides assurance to postal customers that their mail will be delivered safely and securely. This is particularly important for mailers such as health care providers, financial institutions, and other service providers who are obligated to protect the personal information of account holders, including when such information is being conveyed to account holders through the U.S. mail.

The USPS provides customers the right to use the "Optional Company Information Line" (OCIL) when, for example, the recipient named above is not the owner of the receptacle at the address that follows. However, the use of the OCIL by recipients is not restricted to such applications; in fact its actual purpose is solely to modify the postal service's delivery obligations.

In particular, postal regulations provide that the USPS can deliver mail marked with the "Care Of" address line either to the recipient named above, or to the receptacle (or owner of the receptacle) at the address that follows (with the recipient named above taking precedence when both are available at the same moment). In either case, the mail piece is covered by the same full protection of the U.S. Postal Inspection Service.

The Manner in which Individuals Have Paper Correspondence Addressed to Them—With regard to the second item noted above, the manner in which individual account holders direct government entities and/or commercial interests to address paper correspondence to them, generally a name and address is used for this purpose, even though such information is often insufficient to identify a specific individual. This is despite the fact that service provider/service receiver relationships must by their very nature be unambiguous, i.e. between separate and distinct individuals and/or legal entities, even when different clients/recipients (the word "recipient" will be utilized to refer to a client) bear the same name. Further, even when different recipients bear the same name and reside at the same address, the government entities and/or commercial interests still quite clearly distinguish the individual identities of the separate account holders, as they obviously must in order to uphold their contractual commitments to the service receivers.

To uphold this obligation in spite of the non-uniqueness of names and addresses, government entities and/or commercial interests go extra lengths to eliminate potential ambiguity when establishing such relationships, for example by requiring the recipient to show a photo ID to a trusted associate or by hiring a notary to certify that a person with a particular name and address is one specific legal entity and not any other.

Upon achieving this "special state of certainty" about the uniqueness of an individual's identity, the government entity or commercial interest uniquely (for its purposes) identifies its relationship with the recipient using a special designator, usually referred to as an account number. The term "account number" is imprecise because designators often include letters as well as numbers, but in all cases the designator is: 1) unique (within the government entity or commercial interest); 2) is associated with one particular legal recipient entity and not any other; and 3) is the service provider's primary identifier of the relationship, i.e. the recipient's name and address can be non-unique without compromising the "special state of certainty" achieved at the outset of the relationship.

Thus, a discrepancy often exists whenever a government entity or commercial interest addresses paper correspondence to individual account holders: There is a "special state of certainty" about the identity of the intended recipient, but the means by which the delivery address is composed is unable to uphold this level of unambiguousness.

The Manner in which Individuals Have Electronic Correspondence Addressed to Them—With regard to the third item noted above, the manner in which individuals direct government entities and commercial interests to address electronic correspondence to them, typically this is done using an email address. To a large degree this alleviates the delivery address ambiguity problem. When the recipient initially shares their email address with the service provider, it is checked for uniqueness and validity in a manner that delivers much the same assurance that mailers obtain when recipients submit postal addresses. Afterwards the service provider usually allows the recipient to choose whether their correspondence should be handled via paper mail, email, or both, and depending on the selection, one or the other type of address is used for transmission.

The other means by which correspondence is transmitted electronically is via digital mailbox service providers such as Volly, Zumbox, doxo, and Manilla. The manner in which recipients direct government entities and/or commercial interests to transmit correspondence using these channels often requires that the recipient share confidential information with the digital mail box service provider.

In some embodiments, the subject invention is directed to providing the recipient with an "OCIL digital mailing address" supplied by an OCIL-compliant "digital mailing services provider" that the recipient enters into the "Optional Company Information Line" of their delivery address (often between the recipient's name and street address). The OCIL-compliant Digital Mailing Services Provider (OCIL DMSP) is a commercial entity with which the recipient establishes an as-above "special state of certainty" relationship, identified as usual by an account number assigned and controlled by the DMSP. The DMSP then supplies the recipient with a special kind of "address", an OCIL-compliant "digital mailing address", which is a unique but non-confidential identifier suitable for presentation through the address window of an envelope (or printed on an envelope or applied to an envelope)—just like a postal address—but which only the recipient and the DMSP know to be associated with that recipient's DMSP account number.

In some embodiments, the subject invention allows the recipient with a means to impact how the paper mail correspondence address is created. For example, the DMSP recipient contacts any government entity or commercial interest from which they expect to receive paper correspondence and changes their mailing address to include their OCIL Digital Mailing Address in the "Care Of" line (again, often between the recipient's name and street address). In each case their new delivery address would appear, for example, as seen in FIG. 2 (assuming a DMSP name of DMSP and Digital Mailing Address of 12345768).

The result is a delivery address that the intended recipient can recognize unmistakably as directed solely to them. And because the delivery address still conforms to USPS standards, the mail piece continues to enjoy the full protection of the U.S. Postal Inspection Service all the way to the physical receptacle. Note that no other changes are required on the part of the mailer; the changes are solely to the recipient's OCIL, which is controlled by the account holder.

The problem of identical letters addressed to same-name, same-address recipients is immediately solved because the DMSP recipient can direct that any number of government and/or commercial interests also use C/O DMSP #12345678 on the Optional Company Information Line of all paper correspondence.

The DMSP recipient does not need the permission of any of these "special state of certainty" mailers to use the invention in this fashion, yet the recipient still receives all the benefits of reduced uncertainty as to the intended recipient.

The recipient is assured by their "special state of certainty" relationship with the DMSP that no other individual possesses the same digital mail box at DMSP #12345678. Additionally, mailers sending such paper correspondence are assured that each mail piece will still enjoy the full protection of the U.S. Postal Inspection Service all the way to the physical receptacle. At the same time, the invention provides the recipient with a means to solve electronically transmitted correspondence problems as well.

If a mailer chooses, it can establish relationships with one or more OCIL DMSPs, such that if one of the mailer's recipients enters an OCIL-compliant Digital Mailing Address on the Optional Company Information Line for their paper correspondence, the mailer can check it for uniqueness and validity in much the same way that they do postal addresses or email addresses.

For example, the USPS today provides mailers with a means for verifying that delivery addresses for physical receptacles are composed in a manner that exactly matches one and only one receptacle out of all those the USPS can reach, and even to correct it if such correction can be made with assurance. DMSPs can provide a similar means for providing the exact same level of assurance of OCIL digital mailing address quality. Upon doing so, the mailer now has a new channel for electronically transmitting correspondence to the recipient: via the recipient's OCIL digital mailing address (OCIL DMA). Mailers have a significant incentive to do so because conveying correspondence to recipients electronically is much less expensive than doing so via USPS.

The subject invention provides a straight forward means for the recipient to indicate to participating mailers that the recipient's correspondence should be directed to their digital mail box at the DMSP rather than to the USPS's physical receptacle. That means is by indicating so on the "Care Of" line itself, by modifying the content in compliance with the DMSP's specifications. Mailers will recognize the notation because doing so was one of the requirements that had been agreed between the mailer and the DMSP when the mailer established a digital mailing relationship with the DMSP.

In some embodiments, the invention allows for the particular manner in which the composition of the "Care Of" line is changed to indicate the recipient's preference for electronic delivery to be determined by the DMSP. An example of how such a change might be carried out is shown in FIG. 3. In this case, the word Paperless is appended to the end of the "Optional Company Information Line" signaling that, should the mailer be prepared to do so and choose to do so, the recipient would prefer that an electronic version of the document be transmitted to digital mail box #12345678 using digital mail services provider DMSP, and the mailer can be assured that the document will be transmitted to the recipient securely and reliably and in accordance with their wishes.

Note that the subject invention provides a means for the recipient to switch electronic delivery on and off without changing anything in the mailer's database other than their own delivery address. All the recipient has to do is change the content of the OCIL of the delivery address that they've asked the mailer to use for their correspondence.

Also, note that the subject invention provides a means for the recipient to change from one OCIL DMSP to another without changing anything in the mailer's database other than their delivery address.

Further, note that the subject invention provides the recipient a means to have any mailer include fully OCIL DMSP-compliant digital addressing information and directions in the "Optional Company Information Line" without obtaining the mailer's permission, and regardless of whether the mailer maintains any relationships with OCIL DMSPs or supports any OCIL DMSP-compliant functionality.

Furthermore, in some embodiments, note that the subject invention provides the recipient a means to enjoy OCIL DMSP services without necessarily impacting any of their other correspondence channels. For example, OCIL DMSP recipients can choose to continue receiving correspondence via paper mail, email, and even other Digital Mailbox Services providers, or any combination thereof, because the invention does not in any way impede the delivery of correspondence over any of these channels.

Moreover, in some embodiments, note that the subject invention provides the recipient a means to enjoy otherwise-unobtainable OCIL DMSP services by having paper mail pieces intercepted in transit by third party mailers and commingling service providers who can reliably determine the recipient's wishes and carry them out using solely the information contained in the OCIL digital mailing address, because all the necessary delivery address information is contained in the line "C/O DMSP #12345678 Paperless", as seen in FIG. 3. In such cases, provided that the third party mailer and/or commingling service provider has established the necessary relationship with the called-for OCIL DMSP and upholds the associated requirements for information security and handling reliability, and since the USPS likely has not yet been paid to physically deliver the mail piece, it could very well be more economical to follow the recipient's wishes and convert the document to electronic format and transmit it by OCIL DMSP, then securely destroy the original paper mail piece.

FIG. 4 is a flow diagram that displays the components of an exemplary subject system and process in accordance with some embodiments of the present invention. Initially, as seen in step 5 of FIG. 4, a DMSP and a specific recipient communicate with one another about the creation of recipient-specific handling information indicia. The communication may be by physical mail or by electronic means (webpage, email, social media, and the like) and may be the result of an advertisement or offer by the DMSP for electronic mailing services to which the recipient responds. Once the handling information indicia is created by DMSP it is provided to the recipient by a suitable means (physical mail or electronically).

In some embodiments, the recipient may communicate to the service provider instructions, either via paper or electronically, for how to handle each mail item by noting the handling information indicia created by the DMSP. Such information may be communicated by the recipient by altering their account information with the service provider to indicate how they would like to have their mail items handled, either via paper mailing, electronically, or both. As seen at step 10 in FIG. 4, frequently the recipient enters their account details information form (physically or electronically) and then the handling information indicia is entered by the recipient in a "mailing address line 1" entry space or the USPS-acceptable "C/O" line between the recipient's name and a street address.

As can be seen at step 15 in FIG. 4, once the service provider receives the mail item handling information indicia from the recipient the service provider prints the recipient's handling information indicia (letters and/or numbers and/or characters) on each mail item. The printing may be on a sheet inside an envelope that shows through a transparent window or on the exterior surface of the mail item or by any equivalent means.

Next, in step 20 of FIG. 4, either the original service provider or the DMSP reads the handling information indicia on delivery address C/O line of each mail item. Appropriate scanners, cameras, and like devices perform the reading process.

Lastly, in step 25 of FIG. 4, either the original service provider or the DMSP processes each mail item as directed by the detected handling information indicia on the delivery address C/O line of each mail item.

Clearly, suitably adapted mailing machines and controlling computers with appropriate programming are interfaced with the various steps in the subject invention.

In some embodiments, the present invention provides for a system for a paper mail recipient to receive improved transmission of correspondence from a service provider via both paper and electronic channels solely through the use of information contained in the Optional Company Information Line of the recipient's delivery address on a mail item, comprising:

a. means for creating by a digital mailing services provider, DMSP, a recipient-specific handling information indicia and providing said recipient-specific handling information indicia to the recipient;

b. means for the recipient to enter said handling information indicia into the Optional Company Information Line, delivery address C/O line, on the mail item, thereby indicating to said service provider their desired handling route for the mail item;

c. means for the service provider to print the recipient's handling information indicia on the mail item;

d. means for either the original service provider or said DMSP to read the handling information indicia on said delivery address C/O line of the mail item; and e. means for either the original service provider or said DMSP to process the mail item as directed by the read handling information indicia on said delivery address C/O line of the mail item.

In some embodiments, the present invention provides for a method for a paper mail recipient to receive improved transmission of correspondence from a service provider via both paper and electronic channels solely through the use of information contained in the Optional Company Information Line of the recipient's delivery address on a mail item, comprising:

a. creating by a digital mailing services provider, DMSP, a recipient-specific handling information indicia and providing said recipient-specific handling information indicia to the recipient;

b. entering by the recipient said handling information indicia into the Optional Company Information Line, delivery address C/O line, on the mail item, thereby indicating to said service provider their desired handling route for the mail item;

c. printing by the service provider the recipient's handling information indicia on the mail item;

d. reading by either the original service provider or said DMSP the handling information indicia on said delivery address C/O line of the mail item; and e. processing the mail item by either the original service provider or said DMSP as directed by the read handling information indicia on said delivery address C/O line of the mail item.

In some embodiments, the information in said handling information indicia on said delivery address C/O line of the mail item that the mail item is to be handled in a paperless manner.

Embodiments of the subject invention include, but are not limited to, a system and method that allows a paper mail recipient to receive improved transmission of correspondence from a service provider via both paper and electronic channels solely through the use of information contained in the Optional Company Information Line of the recipient's delivery address on a mail item. In some embodiments, the exemplary subject system and subject method that is carried out by the subject system comprises: means for creating by a digital mailing services provider, DMSP, a recipient-specific handling information indicia and providing the recipient-specific handling information indicia to the recipient; means for the recipient to enter the handling information indicia into the Optional Company Information Line, delivery address C/O line, on the mail item, thereby indicating to said service provider their desired handling route for the mail item; means for the service provider to print the recipient's handling information indicia on the mail item; means for either the original service provider or said DMSP to read the handling information indicia on the delivery address C/O line of the mail item; and means for either the original service provider or said DMSP to process the mail item as directed by the read handling information indicia on the delivery address C/O line of the mail item. An additional embodiment includes information in said handling information indicia on the delivery address C/O line of the mail item that the mail item is to be handled in a paperless manner.

In some embodiments, the present invention provides an exemplary system that at least includes a mechanism configured to create by a digital mailing services provider, DMSP, a recipient-specific handling information indicia and provide said recipient-specific handling information indicia to a recipient; a mechanism configured to allow the recipient to provide said handling information indicia in an Optional Company Information Line, delivery address C/O line, on a mail item, thereby indicating to said service provider their desired handling route for the mail item so that a paper mail recipient to receive improved transmission of correspondence from said service provider via both paper and electronic channels solely via including said handling information indicia contained in the delivery address C/O line of the recipient's delivery address on the mail item; a mechanism configured to enable the service provider to add the recipient's handling information indicia to the mail item; a mechanism configured to enable the original service provider, said DMSP, or both, to acquire the handling information indicia from said delivery address C/O line of the mail item; and a mechanism configured to enable the original service provider, said DMSP, or both, to process the mail item as directed by the handling information indicia.

In some embodiments, the present invention provides an exemplary computer-implemented method that includes creating by a digital mailing services provider, DMSP, a recipient-specific handling information indicia and providing said recipient-specific handling information indicia to a recipient; enabling the recipient to provide said handling information indicia in an Optional Company Information Line, delivery address C/O line, on a mail item, thereby indicating to said service provider their desired handling route for the mail item so that a paper mail recipient to receive improved transmission of correspondence from said service provider via both paper and electronic channels solely via including said handling information indicia contained in the delivery address C/O line of the recipient's delivery address on the mail item; enabling the service provider to add the recipient's handling information indicia on the mail item; enabling the original service provider, said DMSP, or both, to acquire the handling information indicia from said delivery address C/O line of the mail item; and enabling the original service provider, said DMSP, or both, to process the mail item as directed by the handling information indicia.

Embodiments of the present invention may be described with reference to equations, algorithms, and/or flowchart illustrations of methods according to embodiments of the invention. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the equation(s), algorithm(s), and/or flowchart(s).

Accordingly, the equations, algorithms, and/or flowcharts support combinations of means for performing the specified functions, combinations of steps for performing the specified functions, and computer program instructions, such as embodied in computer-readable program code logic means, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation(s), algorithm(s), and/or block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A mailing system comprising:
    a first computer programmed to create a recipient-specific handling information indicia for a mail item recipient associated with a mail item;
    a physical mailing mechanism or an electronic channel mechanism wherein each respective mechanism is configured to allow the mail item recipient to modify the recipient-specific handling information indicia, either:
    i) physically in a field on a printed mail item, or
    ii) electronically, thereby indicating to a digital mailing services provider (DMSP) of the mail item recipient's desired handling route for the printed mail item.

2. The mailing system of claim 1, further comprising:
    a second computer programmed to enable the DMSP to add the modified recipient-specific handling information indicia to future mail items.

3. The mailing system of claim 1, wherein the recipient-specific handling information indicia comprises a sequence of at least one of letters, numbers, or characters, or any combination thereof.

4. The mailing system of claim 1, wherein the DMSP is at least one digital mailing service provider with a relationship associated with the mail item recipient.

5. The mailing system of claim 1, wherein the physically mail mechanism comprises a printing computing device.

6. The mailing system of claim 1, wherein the DMSP is at least one optional company information line compliant digital mailing service provider of a plurality of optional company information line compliant digital mailing service providers.

7. The mailing system of claim 1, wherein the modified recipient-specific handling information indicia comprises at least one alteration to account information associated with the mail item recipient.

8. A computer-implemented method comprising:
    creating, by at least one processor of a computing device, a recipient-specific handling information indicia for a mail item recipient associated with a mail item;
    instructing, by the at least one processor of the computing device, a physical mailing mechanism or an electronic channel mechanism to modify the recipient-specific handling information indicia, either, physically in a field on a printed mail item, or electronically, to form a modified recipient-specific handling information indicia, thereby indicating to a digital mailing services provider (DMSP) of the mail item recipient's desired handling route for the printed mail item so that the mail item recipient receives improved transmission of correspondence from the DMSP via both paper and electronic channels;
    wherein the recipient-specific handling information indicia and modified recipient-specific handling information indicia are distinct from a mailing address of the mail item recipient; and
    instructing, by the at least one processor of the computing device, to add the modified recipient-specific handling information indicia associated with the mail item recipient to future mail items,
    wherein the at least one processor of the computing device is associated with a service provider.

9. The computed-implemented method of claim 7, wherein the recipient-specific handling information indicia comprises a sequence of at least one of letters, numbers, or characters, or any combination thereof.

10. The computed-implemented method of claim 7, wherein the service provider is at least one digital mailing service provider with a relationship associated with the mail item recipient.

11. The computed-implemented method of claim 7, wherein the physically mail mechanism comprises a printing computing device.

12. The computed-implemented method of claim 7, wherein the service provider is at least one optional company information line compliant digital mailing service provider of a plurality of optional company information line compliant digital mailing service providers.

13. The computed-implemented method of claim 7, wherein the modified recipient-specific handling information indicia comprises at least one alteration to account information associated with the mail item recipient.

14. The computed-implemented method of claim 7, further comprising:
   transmitting, by the at least one processor of the computing device, to another service provider an indication of the mail item recipient's desired handling route for the printed mail item so that the mail item recipient receives the improved transmission of correspondence via both paper and electronic channels.

15. A computer-implemented method comprising:
   creating, by at least one processor of a computing device, a recipient-specific handling information indicia for a mail item recipient associated with a mail item;
   instructing, by the at least one processor of the computing device, a physical mailing mechanism or an electronic channel mechanism to modify the recipient-specific handling information indicia, either, physically in a field on a printed mail item, or electronically, to form a modified recipient-specific handling information indicia, thereby indicating to a digital mailing services provider (DMSP) of the mail item recipient's desired handling route for the printed mail item so that the mail item recipient receives improved transmission of correspondence from the DMSP via both paper and electronic channels;
   wherein the original recipient-specific handling information indicia and modified recipient-specific handling information indicia are distinct from a mailing address of the mail item recipient;
   instructing, by the at least one processor of the computing device, to add the modified recipient-specific handling information indicia associated with the mail item recipient to future mail items; and
   transmitting, by the at least one processor of the computing device, to a service provider an indication of the mail item recipient's desired handling route for the printed mail item so that the mail item recipient receives the improved transmission of correspondence via both paper and electronic channels so that to enable the original service provider to process the mail item as directed by the modified recipient-specific handling information indicia.

16. The computed-implemented method of claim 15, wherein the recipient-specific handling information indicia comprises a sequence of at least one of letters, numbers, or characters, or any combination thereof.

17. The computed-implemented method of claim 15, wherein the service provider is at least one digital mailing service provider with a relationship associated with the mail item recipient.

18. The computed-implemented method of claim 15, wherein the modified recipient-specific handling information indicia comprises at least one alteration to account information associated with the mail item recipient.

* * * * *